Jan. 19, 1937.  A. J. SYNCK  2,068,092
HAY RAKE
Filed Nov. 25, 1935  2 Sheets-Sheet 1
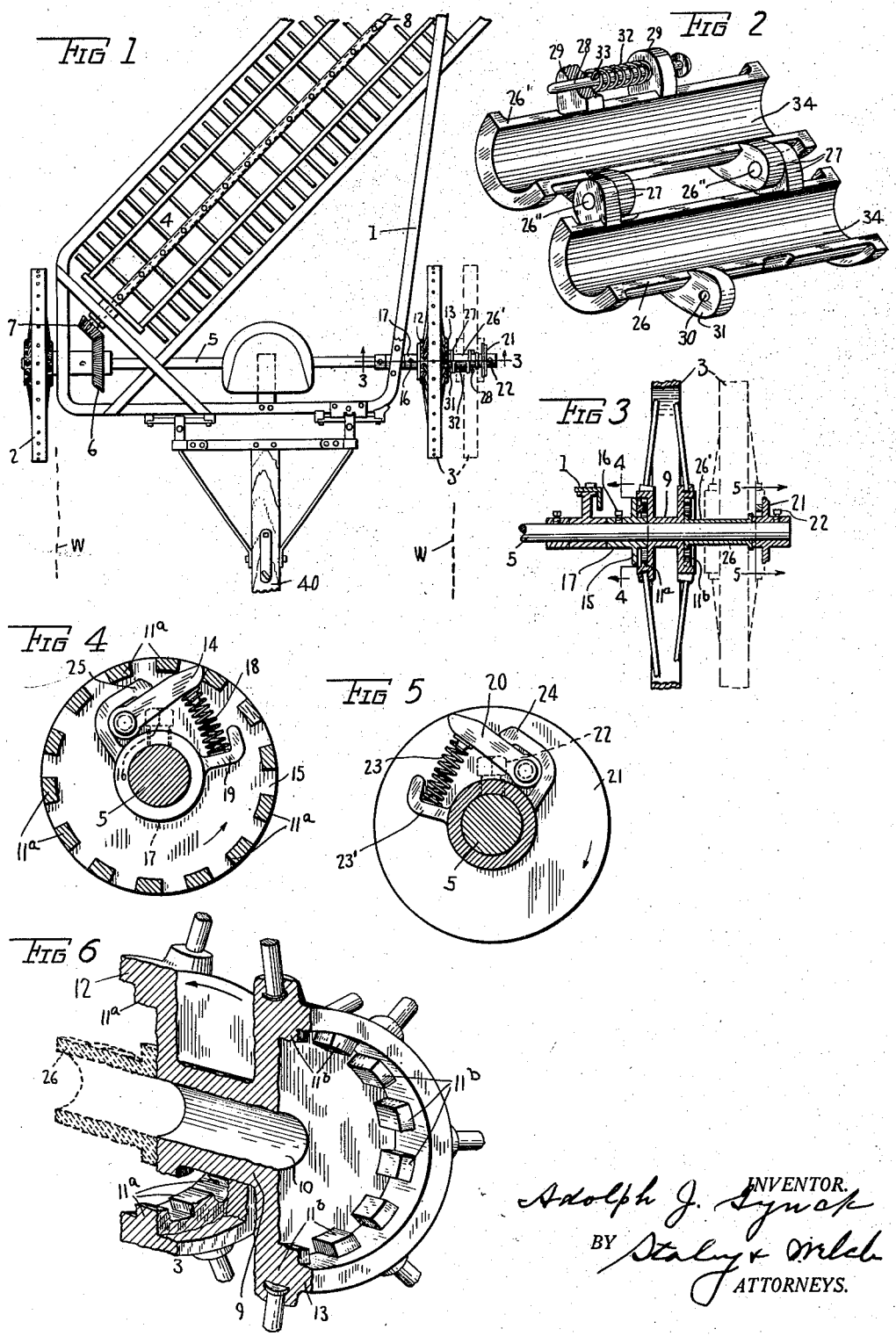
INVENTOR.
Adolph J. Synck
BY Staley & Melch
ATTORNEYS.

Jan. 19, 1937.  A. J. SYNCK  2,068,092
HAY RAKE
Filed Nov. 25, 1935  2 Sheets-Sheet 2
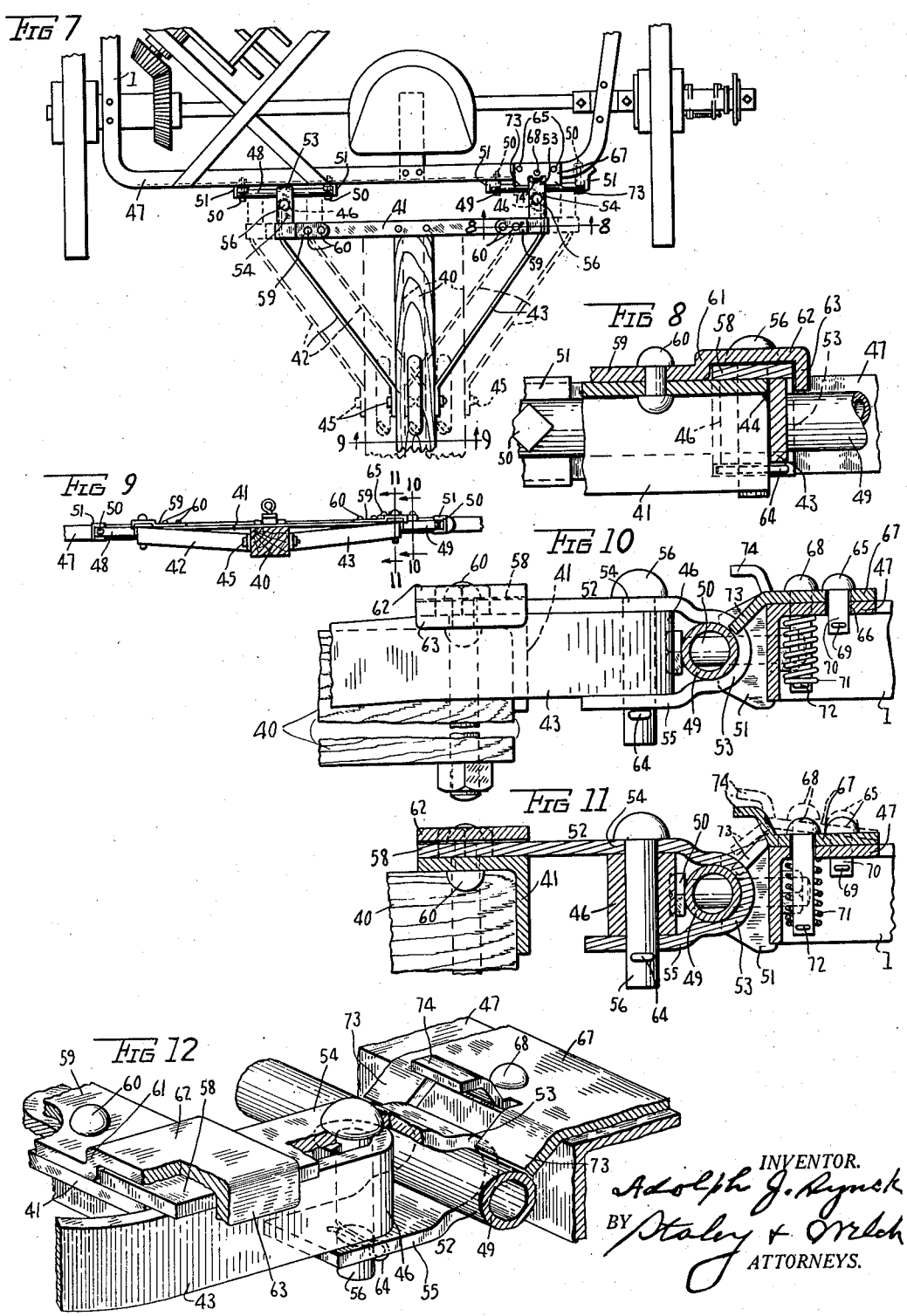

UNITED STATES PATENT OFFICE 2,068,092

HAY RAKE

Adolph J. Synck, Coldwater, Ohio, assignor to New Idea, Inc., Coldwater, Ohio, a corporation of Ohio Application November 25, 1935, Serial No. 51,408

9 Claims. (Cl. 56—376)

This invention relates to improvements in hay rakes of the side delivery type, the invention relating more particularly to improvements whereby one of the carrying wheels may be shifted axially to increase or decrease the tread of the wheels, and whereby the tongue may be shifted laterally with respect to the machine.

In the raking of some certain crops, particularly the crops from which it is intended to thresh seed, such as clover, beans and the like, if one of the horses is forced to walk on an edge of a windrow, or if one of the wheels must travel on a portion of a windrow, it is desirable to shift the wheel axially sufficiently to clear the windrow and also to move the tongue laterally so that the horse may likewise clear the windrow, it being clear that the rolling action of the wheel and the trampling of the horse on the seed pods breaks the pods and the seed loss is then comparatively heavy.

An object of the invention is the provision of means whereby the shifting of either tongue or wheel can be quickly and easily performed and the retaining means for the wheel and tongue removed and reapplied as easily and quickly.

A further object of the invention is to provide an arrangement whereby rotary movement may be transmitted to the axle from the carrying wheel by a pawl and ratchet drive in either one of the shifted positions of the wheel.

A further object of the invention is to provide an improved form of retaining means for the shiftable wheel which can be positioned on either side of the wheel without disturbance of other parts.

A further object of the invention is to provide improved means for permitting the adjustment of the tongue laterally with respect to the frame.

Referring to the drawings:

Fig. 1 is a top plan view of a fragment of a side delivery rake to which the invention has been added, the parts of the rake not considered novel being shown only conventionally.

Fig. 2 is a perspective view of a mechanism in detail, which mechanism is employed in retaining the wheel in its shifted position.

Fig. 3 is a fragmentary enlarged tranverse section on the line 3—3 of Fig. 1.

Fig. 4 is an enlarged transverse section on the line 4—4 of Fig. 3.

Fig. 5 is an enlarged transverse section on the line 5—5 of Fig. 3.

Fig. 6 is a view partly in perspective and partly in radial section of a detail. The scale is the same as in Figs. 4 and 5.

Fig. 7 is a top plan view similar to Fig. 1 but on a slightly larger scale, and shows the shiftable tongue in greater detail; the remaining fragmentarily shown portion of the rake is a conventional showing thereof.

Fig. 8 is an enlarged fragmentary transverse section on the line 8—8 of Fig. 7.

Fig. 9 is a transverse section on the line 9—9 of Fig. 7.

Fig. 10 is an enlarged fragmentary longitudinal section on the line 10—10 of Fig. 9.

Fig. 11 is an enlarged fragmentary longitudinal section on the line 11—11 of Fig. 9.

Fig. 12 is a view mainly in perspective with some of the parts broken away to show details in section, of one portion of the connection of the shiftable tongue with the main frame of the rake.

Referring to the drawings, there is shown in Figs. 1 and 7 so much of a rake of the side delivery type as will permit an understanding of the invention, while in the other views the details thereof are made clear.

The main frame of the rake is indicated at 1. As is usually the case in such machines, the major portion of the weight of the machine is supported on two main wheels such as at 2 and 3 near the forward end, and also by trailing wheels (not here shown) at the rearward end. To rotate the revolving raking cylinder 4, the main wheels 2 and 3 are driving wheels, obtaining traction from the ground and transmitting power to the live axle 5 on which the forward portion of the machine is rotatably supported. From the live axle 5 the power is transmitted to the raking cylinder 4 through the bevel gears shown conventionally at 6 and 7, the gear 6 being secured by a clutch to the live axle 5, while the pinion 7 is secured in a similar manner (not shown) to the shaft 8 of the raking cylinder. To provide for the usual movements of a machine of this type, such as forward travel, backing and turning, the drive wheels are indirectly connected to the live axle; the driving connections in the present case for each wheel being a pawl and ratchet arrangement here modified to suit the conditions of the invention and explained at a later point in the specification. The machine is drawn by any source of power such as by animals or tractors, the hitch being made in some form to the tongue, a portion of which is seen at 40.

It is a common practice in the cutting of many crops which are to be raked by such a machine, that first, windrows are made by turning swaths of a mowed crop into windrows after a certain length of partial drying time has elapsed, and later these windrows are turned over by another passage of the machine whereby the lower side of the windrow is exposed to complete the curing process. In order to accomplish the latter, the wheel next to the windrow is set in and this wheel then passes along the windrow on the inside, and only the outer portion of the machine is used to turn the windrows over.

In the present invention, the shifting of this movable wheel and tongue may be accomplished so easily and quickly, that in raking machines improved by the addition of the invention, the operation thereof is more rapid and convenient than in the best of the older forms of shiftable wheel machines, since in most of the earlier forms, a considerable amount of disassembling had to be done to effect the shift. The necessity for a quick change is all the more apparent when it is considered that an operator may find it advisable to make the shift several times a day.

As previously stated, the shiftable wheel in the present case is the inside wheel 3, and as each wheel 2 and 3 does a share of the driving of the live axle 5, provision is made in the construction of the shiftable wheel 3 that this wheel still does its share of the driving whether the wheel is in its outer or inner shifted position. To explain this feature, it will be necessary to describe the form of pawl and ratchet drive by which a drive wheel is connected with the live axle. As is well known, it is intended that in raking the raking cylinder is rotated in the correct direction of rotation when the machine is travelling in a forward direction, and when the machine is turning the drive is momentarily taken up by one only of the wheels in order to allow turning without unduly twisting the axle or slipping or dragging one of the wheels as would occur if each wheel were rigidly attached to the same axle.

Each wheel, therefore, is rotatably mounted on the live axle 5. Referring to the shiftable wheel 3, an axial section of its hub 9 is shown in Fig. 6, wherein a portion of the bore 10 fitting the axle 5 is seen. To transmit the power to the axle, a series of ratchet teeth 11a and 11b are cast on the interior surface of each of the axially extending tubular extensions 12 and 13 projecting from each side of the main body of the hub 9. When the wheel 3 is in its inner shifted position as shown by the full line position in Fig. 3, the series 11a ratchet teeth coact with a pawl 14 (Fig. 4) pivotally mounted on the side of a disk 15 secured at the proper point on the live axle 5 by a set screw 16 threaded in the hub 17 of the disk. The pawl is normally forced outwardly by the action of the spring 18 bearing against a stop 19, but can go no further than the ratchet teeth 11a or the spaces therebetween. Therefore, on rotation of the wheel in the forward direction as shown by the arrow on the hub 9 (Fig. 6) the axle 5 is necessarily rotated in the same direction, that is, in the direction of the arrow in Fig. 4. Obviously, when backing or turning the machine the teeth 11a slip over and depress the pawl 14 against the action of the spring 18.

When the shiftable wheel 3 is moved to its outermost position as shown by the broken line outline in Fig. 3, the series 11b of the ratchet teeth engage a pawl 20 pivotally mounted on the side of a hubbed disk 21 (Fig. 5) complemental to the disk already described. The hubbed disk 21 is secured by a set screw 22 near or at the outer end of the axle 5, which is extended at this end a length sufficient to provide a shift of the desired extent.

In Fig. 3 the line 4—4 indicating the point at which the section is taken passes through the ratchet teeth 11a, and accordingly these teeth are shown in section in Fig. 4; the section line 5—5, however, passes in front of the ratchet teeth 11b, so therefore no teeth are shown in Fig. 5. The construction and arrangement of the pawl 20 is the same as for the pawl 14, but on the reversed hand, and the pawl 20 is also provided with a spring 23 to urge the pawl 20 outwardly, the stop for the spring being indicated at 23'. When the wheel is in one of its possible positions, the pawl on the disk at the other end is not enclosed by the confining effect of a series of teeth, therefore, to provide that the pawl in such events will not be forced outwardly by its spring to an extent that shifting would be made difficult, an integral lug is cast on the side of the disk, such as the lug 24 on the disk 21, and the lug 25 on the disk 15 to limit the outward position of the pawls.

Since the shiftable wheel is freely slidable along the axle between the limits offered by the opposed disks 15 and 21, provision is made to retain the wheel in one or the other of its shifted positions. The retaining means is a split, hinged spacing sleeve or spool best shown in detail in the perspective view Fig. 2, which shows the spool in its open position. As shown in Figs. 1 and 3, the spool occupies the space between the disk 21 and the hub 9 of the wheel 3, therefore its length is determined by the distance between the disks less the distance through the wheel hub 9. The halves 26 and 26' of the spool are hinged together as shown by the hinge pins 26'' passed through the ears 27 integrally attached to the halves, and when closed, the halves are locked together by the shot-bolt 28 slidably carried in ears 29 on the half 26' and entering a suitably disposed opening 30 in a single ear 31 in the mating half. A spring 32 is interposed between one of the ears 29 and a cotter 33 passed transversely through the shot-bolt 28 whereby when the shot-bolt is inserted in the opening 30, the bolt will be retained in place against any vibration. When the halves are closed, each half bore 34 unites to form a substantially complete bore of a size to relatively closely fit the axle 5.

In operation the machine may be operated with the shiftable wheel in its inner position as shown by the full lines in Figs. 1 and 3, at which time the split spacing spool is placed on the shaft between the hub 9 of the wheel and the face of the disk 21, and to all intents and purposes the action of the machine is the same as in the prior machines of the type so far as forward, backward or turning movements are concerned, and the drive to the axle 5 is positive as before on forward motion. When it is desired to alter the tread, in this event, to a wider tread, the spacing spool is removed by withdrawing the shot-bolt 28 to release the spool half 26, the spool is removed, and the wheel moved to the outer end of the extended portion of the axle, or to the broken line position in Fig. 3, after which the spacing spool is again replaced on the axle, this time between the hub 9 of the wheel and the adjacent face of the disk 15, as suggested by the broken line showing of the spool in Fig. 6. From the foregoing description it will be seen that there is provided a readily removable and replaceable device to retain the easily shiftable wheel in its shifted positions.

The necessity for shifting a drive wheel as just described usually, but not always, indicates that a shifting of the tongue in the same direction is just as advantageous. As stated, the advisability for making a shift may occur several times in a day's operation. Therefore, an operator should be enabled to make the shift as easily and quickly as possible, so also in the instance of the operation of tongue shifting, the devices by which the tongue is retained in its shifted positions should be readily releasable to permit the tongue to be moved, and as readily replaced to retain the tongue in place. In the present instance, the construction not only permits of a quick shifting thereof, but also by simple means, permits of a very quick detachment of the tongue proper from the machine which is advantageous when the machine is to be stored away.

Referring more especially to Figs. 7 to 12, inclusive, the tongue itself, in the present case, is the wooden member fragmentarily shown at 40. Across the rear end of the tongue 40 is secured an angle iron member 41 of a sufficient length that the effect is to distribute the pull on the frame to separated points as will be seen. Two tongue braces 42 and 43 are employed, one each being secured as by welding, or other means, at a point such as indicated at 44, Fig. 8, to each end of the cross member 41, then bent diagonally towards the tongue to which they are bolted at their forward ends by the bolt 45, Figs. 7 and 9. The rearward end of each of the diagonal braces 42 and 43 is formed into an eye; one only of these eyes is shown in full lines, it being the eye 46 (Figs. 10 and 12). The other eye is shown in dotted lines in Fig. 7 and is formed in the same manner except that it is on the reversed hand, and as can be seen in Fig. 1 and Fig. 7 the axis of each eye is in a vertical plane.

The connection of the tongue thus constructed with the frame of the machine is as follows: At two fairly well separated points on the forward rail 47 of the main frame 1 are secured in parallel relation to the rail 47, two round rods 48 and 49, tubular in the present case for lightness in weight. Each of these rods is secured at each of its ends to the vertical forward side of the rail 47 by bolts 50, the bolts passing transversely through the rods near the ends thereof and through the vertical leg of the forward rail 47, and through saddle members 51 interposed between the rods and the rail to provide a spaced apart relation of the rods and the rail.

Since as will be explained, the spaced apart eyes 46 of the tongue 40 are connected with the rods 48 and 49, the length of the rods depends on the amount of shift desired for the tongue, and the disposition of the pair of rods along the rail depends on where it is desired that the draft animals are to walk. The tongue is detachably and slidably connected with the rods by the use of U-shaped clevises indicated in general at 52, an idea of the longitudinal cross-section and therefore of its general form probably being best obtained from Fig. 11. Referring especially to Fig. 11 it can be seen that the U-bend portion of the clevis as indicated at 53 encompasses the rod 49 about one-half its circumference, and that the upper leg 54 and lower leg 55 of the U-bend are in the present case spread apart to receive the eye 46 on the end of the brace 43. The detachable connection of the eye with the clevis 52 is by means of a pin 56 which passes through aligned openings in the legs 54 and 55 and through the eye 46. To further strengthen the connection, the upper leg 54 of the clevis is extended as at 58 to lie over the upper surface of the cross member 41 at the point of the welded connection of the diagonal brace 43 therewith. A pocket is formed to receive the extended portion 58 of the clevis 52 by the securing on the upper surface of the cross member 41 at the end thereof a strap 59. As seen best in Fig. 8 the strap member 59 is secured as by rivets 60 to the cross member 41, and is then bent upwardly as at 61 (Figs. 8 and 12) and horizontally as at 62 to lie over the end of the cross-member 41 and downwardly as at 63 to complete the pocket.

Referring to Fig. 12 which shows one of the connections of the tongue with the frame, it will be clear that to detach the tongue from the machine, the cotters such as 64 are removed from the pins 56, the pins are withdrawn from the clevises, and the tongue drawn forwardly, leaving the clevises hanging on the rods, from which the clevises may be finally removed if desired. To attach the tongue to the machine, each of the clevis extended portions 58 is entered into its respective pocket and the tongue is moved rearwardly until the eyes are aligned with the openings in the clevis legs 54 and 55, after which the pins are inserted and retained by the cotters 64.

From this it will be seen that there is provided a hingeable connection of the tongue with the machine, obtained through the direct connection of the clevises with the rods, and that also the tongue may be moved laterally by a sliding movement from side to side as indicated by the three positions shown in full and broken lines in Fig. 7. To retain the tongue in any one of the three positions as desired is the function of the member now to be described. This member engages one of the clevises 52, and as one only is needed, the clevis near the shiftable wheel is the one to be engaged, as when an operator is shifting this wheel, he can also very readily shift the tongue, it having been stated that in almost all cases where it is advisable to shift the wheel it is also preferable to shift the tongue.

The tongue retaining member is formed of suitably heavy flat sheet metal, and is loosely mounted on the upper surface of the forward rail 47. In the present case, this loose connection is by means of three pins, two shorter pins 65 passing through openings 66 (one only being shown in Fig. 10) in the flat portion 67 of the retaining member and through the horizontal leg of the forward rail, these openings being somewhat larger than the rivets to provide the desired looseness, and a longer pin 68 also passing through the retainer and the rail. In each of the shorter pins 65 near the lower end thereof there is transversely inserted a cotter pin 69 (Figs. 10 and 11) at such a distance from the lower surface of the horizontal leg of the rail 47 as to provide the space 70, so that the retainer may be lifted to the extent of the space 70, and to hold the retainer down on the rail, a spring 71 surrounds the longer pin and is interposed between the lower surface of the horizontal leg of the rail 47 and a transversely inserted cotter 72 near the lower end of the longer pin.

The forward portion of the tongue retainer is bent downwardly as at 73 to the extent that its forward edge almost makes contact with the rod 49 (Fig. 10) and since the length of the retainer is less than the space between the saddle members carrying the rod 49 by twice the width of the clevis (Fig. 7), it can be seen that by disposing the retainer centrally between the saddle members, that a space is left between each end of the retainer and an adjacent saddle member, which space will accommodate the clevis. In this manner, the tongue is held at either extreme of its possible movement.

To shift the tongue, it is only necessary to lift the tongue retainer, the retainer hinging to a certain extent on the shorter pins so that the forward bent edge is lifted against the action of the spring 71. The extent to which it is lifted is merely sufficient that the forward depending edge 73 clears the clevis as shown by the broken lines in Fig. 11, after which the tongue may be slid laterally along the rods. In order to enable the operator to conveniently lift the retainer, a lifting tab is formed in the center of the forward edge as indicated at 74, the space left by turning upwardly the lifting tab being made wide enough to receive the clevis whereby a central position for the tongue is obtained as shown by the full lines in Fig. 7, the broken lines showing the position of the tongue when the clevis is being retained between the clevis and a saddle member, or at its extremes of position. When the tongue is placed in the desired position, the retainer is released, the spring returning the retainer to its normal position and holding the tongue against displacement by vibration.

It will then be seen that with the construction as described, there is provided a simple, effective and durable retaining means for holding the shiftable tongue in any of its possible positions, and one in which the time of operation is held to a minimum.

By this arrangement the shift is readily made in contrast with the earlier forms amounting to dismantling and reassembling some portion of the machine for it can be seen that when it is understood that the advisability for shifting either the wheel or the tongue, or both, may occur several times in a day's operation, that the operation of shifting either or both of these elements will likely be deferred until a later time or postponed entirely if the operation can only be done at the expense of a great deal of time or labor.

Also, since in the machine for which the improvements are particularly intended, each of the main wheels is a driver whereby the raking cylinder is driven on forward movement of the machine, it is another advantage that the shifted wheel will still do its share of the driving when in either of its shifted positions.

The feature described and shown in this application whereby the tongue may be shifted laterally with respect to the machine and set forth in original claims 9 to 15, inclusive, has been made the subject matter of a divisional application Serial No. 114,982, filed December 9, 1936.

Having thus described my invention, I claim:

1. In a hay rake, a main frame, an axle carried thereby and extended laterally of said frame, a pair of carrying wheels on said axle, means for retaining one of said wheels on said axle extension at different distances laterally with respect to said frame, means stationary laterally on the axle extension for contacting and rotating said axle by rotating said wheel in these positions, a tongue slidably connected to said frame for lateral movement, and means for holding said tongue in different positions laterally with respect to said frame.

2. In a hay rake, a main frame, an axle carried thereby and extended laterally of said frame, a carrying wheel on said axle extension, means for retaining said wheel on said extension at different distances laterally with respect to said frame, and means stationary laterally on the axle extension for contacting and driving the axle by this wheel from these positions.

3. In a hay rake, a main frame, a rotatable axle, a pair of carrying wheels for said frame and axle, said axle being extended laterally beyond said frame, one of said wheels being mounted and shiftable axially on said extension, a removable spacing member adapted to be positioned on said axle on either side of said shiftable wheel, and stationary means for contacting and connecting said axle and said shiftable wheel in either one of the shifted positions of said wheel for driving said axle.

4. In a hay rake, a main frame, a rotatable axle, a pair of carrying wheels for said frame and axle, said axle being extending laterally beyond said frame, one of said wheels being mounted and shiftable axially on said extension, a removable spacing member adapted to be positioned on said axle on either side of said shiftable wheel, and stationary pawl and ratchet devices to drive said axle by said shiftable wheel in either one of the shifted positions of said wheel.

5. In a hay rake, a main frame, a rotatable axle, a pair of carrying wheels for said frame and axle, said axle being extended laterally beyond said frame, one of said wheels being mounted and shiftable axially on said extension, a removable spacing member adapted to be positioned on said axle on either side of said shiftable wheel, a series of ratchet teeth on either end of the hub of said shiftable wheel, a pawl connected with said axle to engage one series of said teeth in one of the shifted positions of said wheel, and a second pawl connected with said axle to engage the other series of teeth in the other shifted position of said wheel.

6. In a hay rake, a main frame, a rotatable axle, a pair of carrying wheels for said frame and axle, a driving connection between said axle and one at least of said wheels, said axle being extended laterally beyond said frame, one of said wheels being mounted and shiftable axially on said extension, and a sleeve formed of two hinged members adapted to be positioned on said axle on either side of said shiftable wheel, together with means for latching said members together.

7. In a hay rake, a main frame, an axle rotatably mounted on said frame and having an extension at one end, a pair of main traction wheels mounted on said axle and supporting said frame, one of said wheels being axially shiftable on said extension, a pair of spaced pawl supporting members secured on said axle extension on opposite sides of said shiftable wheel, a series of internally disposed ratchet teeth on each end of the hub of said shiftable wheel, one series of said teeth coacting with one of said pawls in one shifted position of said wheel and the other series of teeth coacting with the other pawl in another position of said wheel, and detachable spacing means adapted to surround said axle extension on either side of said wheel to retain said shiftable wheel in abutting relation with one or the other of said pawl supporting members.

8. In a hay rake, a main frame, a revoluble raking cylinder, a live axle rotatably mounted on said frame, gearing connecting said axle and said raking cylinder, a pair of main carrying wheels mounted on said axle, a driving connection between at least one of said wheels and said axle to rotate the raking cylinder in at least one direction of rotation thereof, an extension to said axle, means for slidably positioning a driving wheel at points on said extension laterally with respect to the other carrying wheel or to the frame, said driving connection between said shiftable wheel and said axle being positively maintained at the positioned points of the wheel on said axle extension, and detachable means on said axle for retaining said wheel at the said positioned points.

9. In a hay rake, a main frame, a rotatable axle, a pair of carying wheels for said frame and axle, said axle being extended axially beyond said frame, one of said wheels being mounted and shiftable axially on said extension, a removable spacing member adapted to be positioned on said axle on either side of said shiftable wheel, and a pawl and ratchet device on both sides of the wheel to drive said axle by said shiftable wheel in either one of the shifted positions of said wheel.

ADOLPH J. SYNCK.